United States Patent [19]

Taub

[11] Patent Number: 4,896,123
[45] Date of Patent: Jan. 23, 1990

[54] QUADRAPHASE MODULATOR

[76] Inventor: Dov Taub, 1238 E. 26 St., Brooklyn, N.Y. 11210

[21] Appl. No.: 311,962

[22] Filed: Feb. 17, 1989

[51] Int. Cl.$^4$ ............................................. H04L 27/20
[52] U.S. Cl. ................................... 332/103; 333/117; 375/67
[58] Field of Search ............... 332/16 R, 21, 22, 23 R; 375/52–56, 67, 57; 333/117–123, 101

[56] References Cited

U.S. PATENT DOCUMENTS

| | | | |
|---|---|---|---|
| 4,021,758 | 5/1977 | Standing | 332/21 |
| 4,276,521 | 6/1981 | Davidheiser | 332/23 R |
| 4,673,898 | 6/1987 | Redmond | 333/109 |
| 4,736,170 | 4/1988 | Wu et al. | 332/21 |

Primary Examiner—Siegfried H. Grimm

[57] ABSTRACT

A quadraphase modulato comprising a first and a second quadrature hybrid, a first and a second phase reversal switch, a selector switch and a switch control means. The quadrature hybrids are connected in tandem by means of two lines connected between the two output ports of the first hybrid and the two input ports of the second hybrid with a phase reversal switch being connected in series with each of these lines. The input port of the quadraphase modulator is one of the input ports of the first hybrid while the output port of the quadraphase modulator is one or the other of the two output ports of the second hybrid. The positions of the phase reversal switches determine the port at which the output signal will appear and its relative phase, which maybe 0, 90, 180 or 270 degrees. The switch control means sets the positions of the phase reversal switches and thus the phase of the output signal and the output port of the second hybrid at which the output signal will appear. The switches control means automatically sets the selector switch to the proper output port to receive the output signal, thereby providing at the selector switch, a single output port for the quadrature modulator. Due to the use of tandem quadrature hybrids which inherently produce signals at low loss that are very nearly in precise quadrature, the present invention provides improved phase accuracy, insensitivity to amplitude imbalance and typically 3 dB less loss than conventional quadraphase modulators.

11 Claims, 1 Drawing Sheet

QUADRAPHASE MODULATOR

BACKGROUND OF THE INVENTION

1. Field of the Invention

The present invention relates to quadraphase modulators, and more particularly to a wideband quadraphase modulator having a high phase accuracy.

2. Description of the Prior Art

Typical quadraphase modulators accept an input signal and may be controlled to produce one of four outputs, the phases of the outputs being in quadrature. Known modulators of this type suffer from a loss in power and in phase accuracy. The output may vary in both phase accuracy and power with frequency.

The following U.S. patents typify the prior art: U.S. Pat. Nos. 4,736,170 to Wu et al.; 4,276,521 to Davidheiser; 4,673,898 to Redmond; and 4,021,758 to Standing. These references disclose the use of a 90° hybrid and a 0° hybrid combination to produce quadrature outputs. A reversing switch is required such as a double balanced mixer or biphase modulator. 90° hybrids depend for operation on the coupling between two circuits. However, the coupling is less at the passband edges of the device and the signal level will vary between output ports, the difference being referred to as the imbalance of the hybrid.

When a 90° hybrid is used with a 0° hybrid, the amplitude imbalance produces a phase imbalance. This problem occurs since each output of the quadraphase modulator is a resultant of two vectors at 90° to one another. The imbalance causes the vectors to be unequal, thereby producing a phase error in the resultant.

There is therefore a need for a quadrature modulator utilizing hybrids that is free from phase error due to imbalance and that will have improved bandwidth and frequency response.

SUMMARY OF THE INVENTION

The present invention is a quadrature modulator using two identical 90° hybrids. One input port of a first 90° hybrid receives the radio frequency signal for which selection of one of the quadrature outputs is desired. The other input port is terminated in its characteristic impedance. Each output port is connected to an input port of a second 90° hybrid via phase reversal switches. Each phase reversal switch is electronically controlled to provide a 0° or 180° phase shift of the signal.

The output ports are connected to a double pole, double throw absorptive switch which connects a selected output port to an output line and the other output port to a matched load. The output at each output port of the second 90° hybrid is the resultant of the summations of two signals which are either in-phase or 180° out of phase and of essentially equal amplitudes. The absorptive switch is operated by an electronic control circuit to connect the port having in-phase signals to the output line, and the port having out of phase signals to a termination.

The phase of the output signals is controlled by the settings of the phase reversing switches. As will be explained more fully hereinbelow, phases of 0°, 90°, 180°, and 270° will occur. Control of the phase reversal switches and the output absorptive switch are controlled to always connect the in-phase output to the output line.

As will be recognized, variations in amplitudes between the two in-phase signals will not result in phase shifts such as occurs with prior art 90°–0° type quadraphase modulators. Advantageously, a significant increase in phase accuracy is achieved by the invention. The insensitivity of phase-to-amplitude imbalance of the invention also results in bandwidths of over two octaves as contrasted with a one-octave bandwidth common in prior art devices.

It is therefore a principal object of the invention to provide an improved quadraphase modulator having a high phase accuracy and a width bandwidth.

It is another object of the invention to provide a quadraphase modulator utilizing tandem connected 90° hybrids such that the output is the sum of two in-phase signals whereby amplitude imbalance of the hybrids does not produce a phase error in the quadrature output signals.

It is yet another object of the invention to provide a quadraphase modulator having electronically controlled phase reversal and absorptive switches to select desired output signals of a selectable quadrature phase.

It is still another object of the invention to provide a quadraphase modulator in which amplitude imbalance of the components thereof does not limit the bandwidth.

These and other objects and advantages will become apparent from the following detailed description when read in conjunction with the drawings.

DETAILED DESCRIPTION OF THE PREFERRED EMBODIMENT

Figure 1:
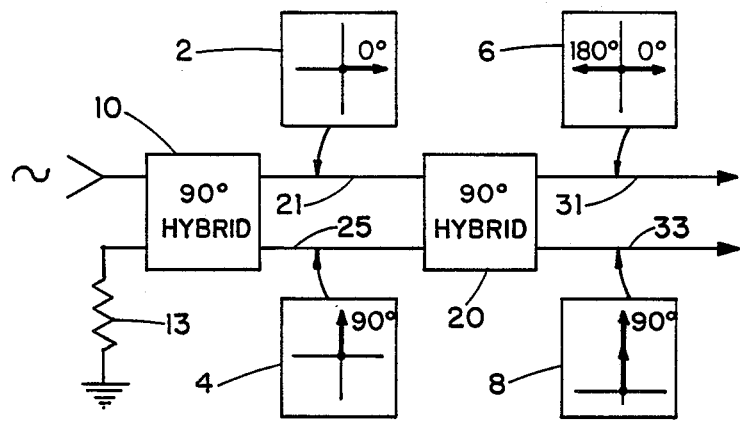
FIG. 1 is a diagram used to explain the principle of the invention.

The quadraphase modulator of the invention utilizes two identical 90° hybrids connected in tandem. The theory of operation of the invention will be described with reference to FIG. 1 which shows a first 90° hybrid 10 having one input port connected to a source of signals, which may be those of the intermediate frequency of an electronic system. The other input port is terminated in a load 13 equal to the characteristic impedance of hybrid 10. The output port 21 will have a 0° phase relationship to the input signal as indicated by the vector diagram 2. The opposite output port 25 will have a 90° phase as shown by vector diagram 4.

Both input ports of a second 90° hybrid 20 are driven by outputs 21 and 25 of hybrid 10. The resultant phase vectors on output ports 31 and 33 are shown by vector diagrams 6 and 8 respectively. The output of port 31 will be the vector sum of the 0° vector 2 and the 180° vector produced by a 90° phase shift of vector 4. Since the two vectors are necessarily of equal amplitude, the signals cancel, and, theoretically, will be zero at port 31. The signal at port 33 will be the sum of the 90° vector 4 and the zero vector 2 shifted 90°. This action places vectors 2 and 4 in phase, producing output vector 8.

Figure 2:
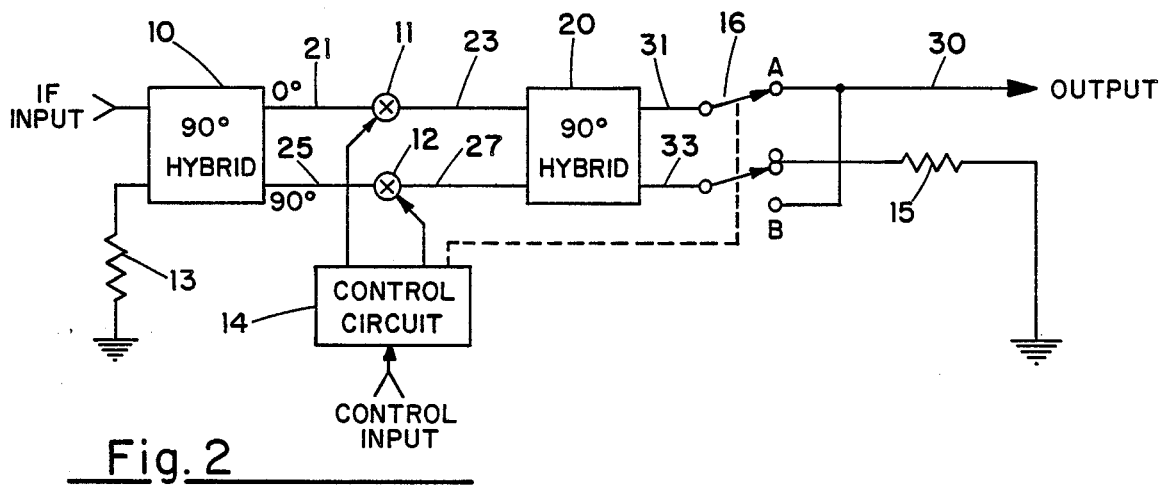
FIG. 2 is a block diagram of the quadraphase modulator of the invention.

Since hybrids 10 and 20 are identical, the output powder from hybrid 20 is essentially equal to the input power except for minor losses. The tandem hybrid combination and reversing switches as shown in FIG. 2 will have an overall loss of about 3 dB. This may be compared to the 6 dB loss in known quadraphase modulators using a 90° hybrid and a 0° hybrid because the 0° hybrid will lose 3 dB internally when supplied with quadrature input signals.

A more important advantage in the tandem 90° hybrid circuit is the avoidance of large phase errors due to amplitude imbalance in the 90° hybrids. When a 90° hybrid is used with a 0° hybrid, the amplitude imbalances cause phase shifts when the vectors from each branch are added at the outputs. if the amplitudes of the two vectors are not equal, their summation results in a phase shift from 45°. In the implementation of FIG. 1, the amplitude imbalance in the two hybrids 10 and 20, even if substantial, does not affect the phase outputs since in phase vectors are added. As will now be recognized, the phase shift through hybrids 10 and 20 will therefore be independent of the amplitude imbalance and the power loss will be reduced over prior art modulators.

Further, since the output amplitudes are more constant, a wider frequency range can be obtained than with prior art devices. For example, typical prior art quadraphase modulators are limited to an octave in bandwidth; the present invention achieves over two octaves with improved phase accuracy.

In FIG. 2, a block diagram of a quadraphase modulator utilizing the principles of the example of FIG. 1 is shown. Output ports of 90° hybrid 10 are connected to the inputs of biphase modulators 11 and 12 respectively. Biphase modulators are utilized as reversing switches and are known in the art. For example, the biphase modulator described in U.S. Pat. No. 4,736,170 to Wu et al. is admirably suited for the present purpose. A switched diode phase shifter disclosed by Standing in U.S. Pat. No. 4,021,758 may also be used.

Output 23 from biphase modulator 11 is connected to a first input port of 90° hybrid 20, and output 27 is connected to the second input port of 90° hybrid 20. The output ports 31 and 33 are connected to absorptive switch 16. In the position shown, output port 31 is connected to output line 30, and output port 33 is connected to load 15 which matches the characteristic impedance of hybrid 20. As explained hereinabove, one port will have zero output due to the 180° phase relationship of the two signals, and therefore load 15 may be omitted. however, it is preferred to terminate the inactive port to prevent reflections due to amplitude imbalance which might occur, particularly near the bandwidth limits.

Figure 3:
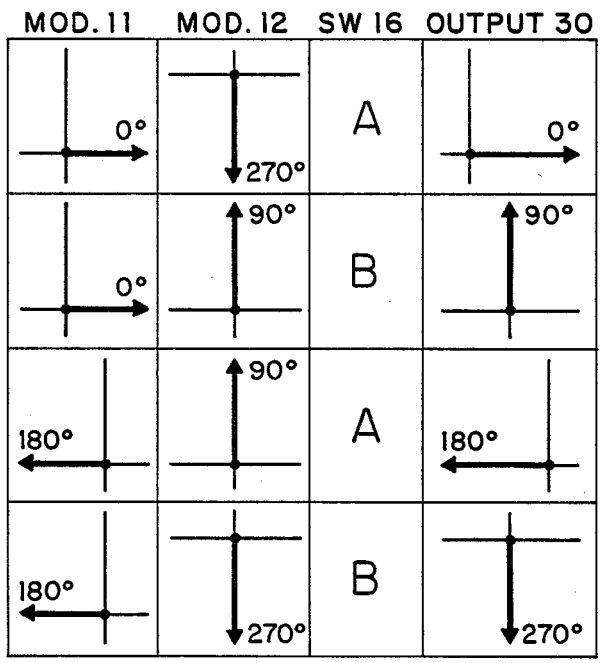
FIG. 3 is a chart showing the quadrature outputs of the quadrature modulator of FIG. 2 as a function of a selector switch and the condition of the biphase modulators.

A control circuit 14 is used to control biphase modulators 11 and 12, and absorptive switch 16. As will be understood from FIG. 3, reversing of the signal phase at ports 23 and 27 of hybrid 20 will change the phase on output line 30. FIG. 3 illustrates the output phases from phase modulators 11, from phase modulator 12 and from output line 30 for the possible permutations of FIG. 2. For example, when modulators 11 and 12 are switched to the 0° phase or forward condition, switch 16 is placed in the B position. This represents the "straight through" condition used as an example in FIG. 1 in which the 0° vector is shifted 90° and adds to the 90° vector producing a 90° output phase shift. When modulator 12 is reversed and switch 16 set in the A position, the output is 0°. With modulator 11 and 12 reversed, the B switch position produces a 270° phase output. With modulator 11 reversed, modulator 12 forward, and switch 16 in the A position, a 180° output phase results.

As will now be seen, control of modulators 11 and 12, and switch 16 permits selection of a desired one of quadrature output phases. Although switch 16 is shown in schematic form, electronic switch means, such as diodes and the like, may be used, responsive to control signals at the control circuit 14 input.

It is to be understood that the circuits shown have been for exemplary purposes only and various modifications and substitutions can be made without departing from the spirit and scope of the invention.

I claim:

1. A quadraphase modulator for receiving a radio frequency input signal and selectively producing one of four output signals having relative phases in quadrature, comprising:

a first 90° hybrid having a first pair of input ports and a first pair of output ports, one of said first input ports connected to receive said input signal;

a second 90° hybrid having a second pair of input ports and a second pair of output ports;

a first phase reversal switch connected between one of said first output ports and one of said second input ports;

a second phase reversal switch connected between the other of said first output ports and the other of said second input ports;

a selector switch for connecting an output line to one of said second output ports; and switch operation means for selectively operating said first and second phase reversal switches and said selector switch for producing a selected one of four possible output signals on said output line, the selected output signal being determined by the positions of the reversal and selector switches and the output signals having a relative phase relationship with respect to one another of 0°, 90°, 180°, or 270°.

2. A quadraphase modulator as recited in claim 1 wherein the other of said first input ports is terminated in the characteristics impedance of said first 90° hybrid.

3. The quadraphase modulator as recited in claim 1 in which said first and second phase reversal switches are double balanced modulators.

4. The quadraphase modulator as recited in claim 1 in which said first and second phase reversal switches are biphase modulators.

5. The quadraphase modulator as recited in claim 1 in which said first and second phase reversal switches are switched diode phase shifters.

6. The quadraphase modulator as recited in claim 1 in which said selector switch is a double pole, double throw absorptive switch.

7. The quadraphase modulator as recited in claim 6 in which said absorptive switch includes a terminating load having an impedance essentially equal to the characteristic impedance of said second hybrid.

8. A quadraphase modulator comprising:

a pair of identical quadrature hybrids, each having a pair of input ports and a pair of output ports;

a first of said quadrature hybrids having an input signal connected to one of said input ports and producing a pair of output signals at said output ports, said output signals having a 90° phase relationship therebetween;

a second of said hybrids having a first input port thereof connected to a first output port of said first hybrid via first means for selectively reversing the phase of said output signal at said first output port of said first hybrid, and a second input port thereof connected to a second output port of said first hybrid via second means for selectively reversing the phase of said output signal at said second output port of said first hybrid; and output switching means for selectively selecting an output from one of said second hybrid pair of outputs in coordination with said first and second phase reversing means for selectively providing one of four possible output signals, said four output signals having 0°, 90°, 180° or 270° relative phase relationship with one another.

9. The quadraphase modulator as recited in claim 8 in which said first and second reversing means are electronically controllable biphase modulators.

10. The quadraphase modulator as recited in claim 8 in which said output switching means is an absorptive switch.

11. The quadraphase modulator as recited in claim 10 in which said absorptive switch is electronically controllable.

* * * * *

UNITED STATES PATENT AND TRADEMARK OFFICE
CERTIFICATE OF CORRECTION

PATENT NO. : 4,896,123
DATED : January 23, 1990
INVENTOR(S) : Dov Taub

It is certified that error appears in the above-identified patent and that said Letters Patent is hereby corrected as shown below:

On the title page:

Item [73] Assignee: Mini-Circuits, Brooklyn, NY.

Signed and Sealed this

Twenty-ninth Day of January, 1991

Attest:

HARRY F. MANBECK, JR.

*Attesting Officer*      *Commissioner of Patents and Trademarks*